Figures 1, 2:
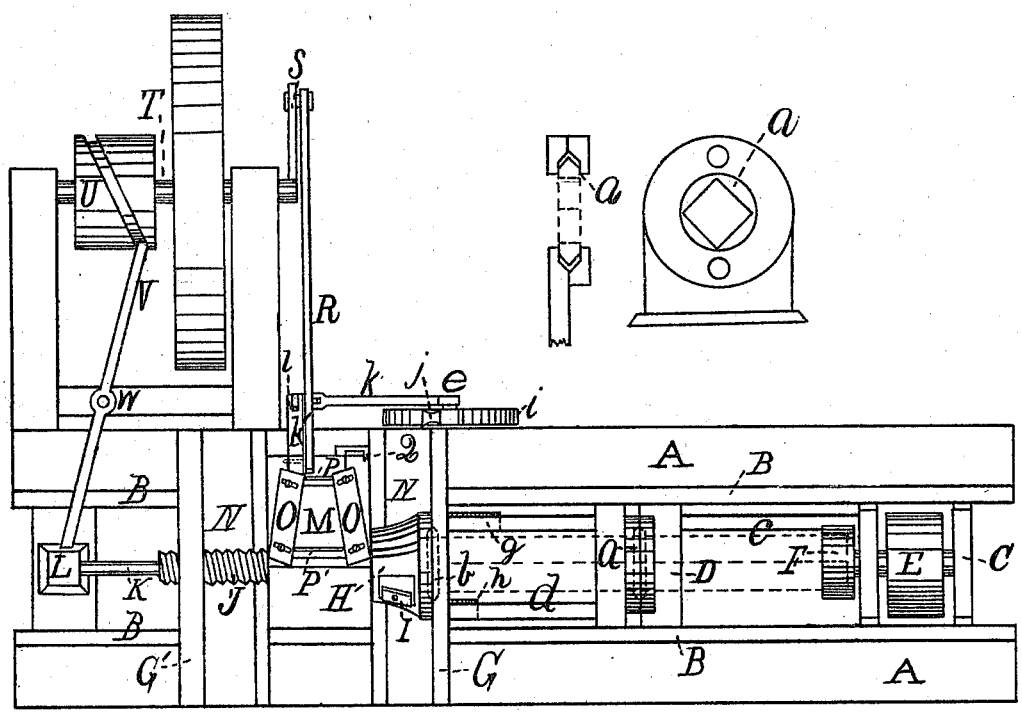

2 Sheets--Sheet 1.

A. T. WING.
Lathes for Turning Spools.

No. 142,314. Patented August 26, 1873.

2 Sheets--Sheet 2.
A. T. WING.
Lathes for Turning Spools.
No. 142,314.      Patented August 26, 1873.
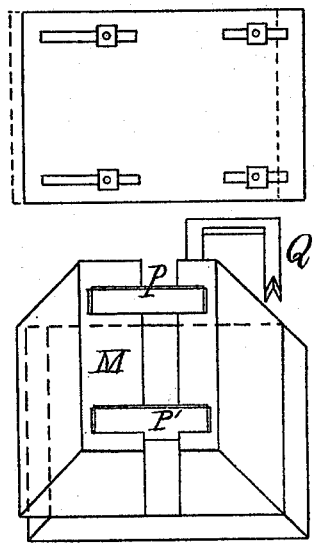
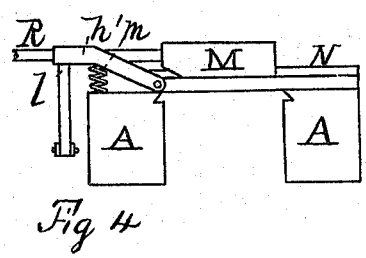
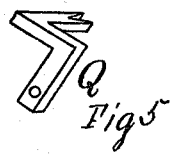
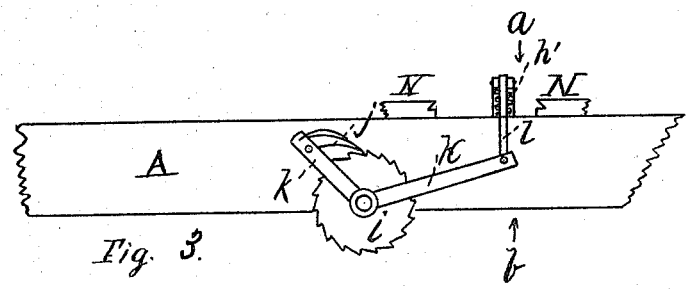
Witness
C. S. Woodard
N. E. Brown
Inventor
Asa T. Wing
Per Wm Franklin Gavey
Atty
AM. PHOTO-LITHOGRAPHIC CO. N.Y. (OSBORNE'S PROCESS)

UNITED STATES PATENT OFFICE.

ASA T. WING, OF OLD TOWN, MAINE, ASSIGNOR TO GEORGE F. DILLINGHAM, OF SAME PLACE.

IMPROVEMENT IN LATHES FOR TURNING SPOOLS.

Specification forming part of Letters Patent No. 142,314, dated August 26, 1873; application filed March 31, 1873.

*To all whom it may concern:*

Be it known that I, ASA T. WING, of Old Town, in the county of Penobscot and State of Maine, have invented certain new and useful Improvements in Lathes for Turning Spools; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 1 shows a plan; Fig. 2, a side elevation; Fig. 3, a partial side elevation; Fig. 4, a section through *a b*, Fig. 3; Fig. 5, detail of knife Q; Fig. 6, detail of cutter-head M.

Same letters show like parts.

The object of my invention is the production of a machine for making spools, tool-handles, &c., which shall perform all its operations automatically, and effect a saving both of labor and material.

The stock from which spools are made comes in square sticks of proper size for turning. By the present method it is sawed into the length required for the spool by being fed by hand to the saw, and afterward turned. Some eight inches of the stick is thus wasted.

Reference to the drawing will illustrate my invention.

A A show a suitable frame, open through the middle, and provided with horizontal grooves or tracks B B, in which move a tail-block, C, and a support, D. The tail-block is provided with a shaft, upon which is a pulley, E, by which the power for turning the stock is applied, and a head-piece, F, having a square hole recessed therein of proper size to receive the end of the stick and give it revolution. The support D is placed half-way between this tail-block and the turning devices, and is annular in form, inclosing a revolving disk, *a*, having in it a square hole, through which the stick passes, and by which it is kept at a true center. At G is a frame, extending from side to side of the frame A, supporting a second revolving disk, *b*, having a square hole therein for the reception of the stick, like disk *a*. To this frame is also secured the cutting-head H, containing the knives I, by which the stick is rounded. The head H is annular in form, having its opening in a line with the holes in the disks *a* and *b*, and the knives project inwardly, rounding the stick as it passes through, and is revolved against them. A second frame, G', supports the center J of the lathe, the outside of which center J has a screw-thread cut therein, working in a corresponding thread in the frame G'. This enables the length of the spool to be regulated by varying the distance between the center J and the end of the cutter-head H. The center J is, moreover, made hollow, so as to allow a bit, K, supported by a rest, L, sliding in the grooves B B, to be pushed through its cavity against the stick. This bit does not revolve, but the revolution of the spool-stick removes the core from it as the bit advances, and makes the hole through the center of the spool. At M is a cutter-head, moving in slides N N across the frame A, for making the thread-space of the spool. It has attached to each of its sides, which are beveled toward the top, knives O O, set at an angle from the horizontal, and secured by screws passing through slots, to permit adjustment as the thread-space is to be more or less deep. Between them, in holes cut in the head M for their reception, are planer-knives P P', their edges horizontal, and the rear knife projecting farther from the surface of the head than the front one. The cutter-head M, from knife to knife O, is just the width of the thread-space required for the spool, and the knife P, at the rear of the head, regulates the depth of said thread-space by its distance from the center of the spool-stick. At the rear end of the cutter-head M is a knife, Q, designed to cut off the spool from the stick when it has been turned out. It is bent, as shown in the detail, so as to bring its cutting-edge close to the end of the cutter-head H, and is so constructed as to cut both stick and spool smoothly. The cutter-head M and its attachments receive a reciprocating motion by means of a rod, R, and crank S upon a shaft, T, moved by a band-wheel thereon. On the same shaft is a second wheel, U, grooved diagonally, and in this groove is the end of a lever, V, having its fulcrum at W, and its opposite end attached to the rest L, supporting the bit K, so that as the shaft T revolves the lever V is thrown backward and forward by the diagonal groove, advancing and withdrawing the rest L in the grooves B B, and throwing forward the bit K attached thereto.

The stick is fed to the cutters as follows: Attached to the tail-block C and support D, respectively, and extending lengthwise of the frame below the grooves B B, are two racks, $c$ $d$. At $e$, nearly under the cutter-head H, is a shaft, crossing the frame A, and running in suitable bearings upon it. Upon this shaft are two gears, one of which, $g$, meshes into the rack $c$ of the tail-block, and the other, $h$, which is just half the diameter of the gear $g$, into the rack $d$ of the center support D. Thus, when the shaft is turned toward the cutting devices, the center support D moves just half as far forward toward them as the tail-block, thus keeping always midway between them, and supporting the stick in its weakest part. At the extremity of the shaft is a ratchet, $i$, turned in the direction of the cutting devices by a pawl, $j$, upon the upper end of a bell-crank, $k$, having its fulcrum at the center of the ratchet. The other extremity of the bell-crank is jointed to the vertical arm of a bent lever, $l$, at right angles thereto. The fulcrum of this lever $l$ is, at the end of its horizontal arm, nearly under the rear end of the cutter M, when it is drawn almost back, and its vertical arm extends down, connecting by a joint to the horizontal arm of the bell-crank $k$. The horizontal arm of the bent lever $l$ forms an inclined plane, $h'$, rising from its fulcrum to the bend of the lever. When the feeding devices are not in operation this arm is kept raised by a spring, $m$, under it, elevating the horizontal arm of the bell-crank $k$, and keeping the upright arm, with its attached pawl $j$, thrown back upon the ratchet. The feed is operated by the back movement of the reciprocating cutter-head M, which strikes against the inclined plane $h$ formed by the horizontal arm of the lever $l$, and forces the vertical arm down, depressing the horizontal arm of the crank $k$, and bringing forward the upright arm of said crank, engaging the attached pawl with the teeth of the ratchet. This revolves the shaft, which, by means of the gears and racks, feeds forward the tail-block and center D, forcing another length of the stick through the cutter-head H, which rounds it in its progress.

From this point the operation of the machine is as follows: As the stick reaches the center J, the bit K, operated, as before described, from the shaft T, is advanced, boring the spool. By the revolution of the same shaft the cutter-head M also advances under the stick, which, turning rapidly against the knives O and P, is cut away, forming the thread-space, and afterward, the knife Q having reached it, it is cut off, and the spool drops, the bit K having been withdrawn meanwhile by the return of the lever. Having done its work, the revolution of the shaft withdraws the cutter-head M, which again feeds up the stick, as before.

As shown in the detail, the cutter-head M may be made in sections, so as to allow the knives O to be set at varying distances from each other, as the space required for the thread be longer or shorter. Its depth, as before stated, may be regulated by raising the knives O and P, and the knives P may be changed so as to correspond with the length of the spool and the distance between the knives O. The revolving disks $a$ $b$ are constructed as shown in the detail, and may, if desired, run in "Babbitt" metal to lessen the friction and wear.

The formation of the edge of the disks beveled toward the outside enables them to be centered and tightened in their sockets in the rests or supports by simply screwing up the side or collar of the support.

A long pulley running lengthwise of the machine may be employed to transmit power to the pulley, enabling the belt to be slipped toward the cutting devices as the tail-block is fed up.

The stock by this machine is almost entirely used, as the tail-block, center support, and cutter-head H may be brought close together, allowing but an inch or two of waste.

By a simple and obvious change in the knives of the cutter-head M, my machine may be adapted to turning tool-handles and similar articles.

What I claim as my invention, and desire to secure by Letters Patent, is—

1. A non-rotating reciprocating bit, K, in combination with the revolving head-piece T, intermediate supports D and H, and hollow center J, as specified.

2. The combination of the support C and tail-block D with their respective racks $c$ $d$ and gears $g$ $h$, whereby the support D is kept under way between the tail-block and cutter-head.

3. The combination of the reciprocating cutter-head M with the lever $l$, bell-crank $k$, ratchet $i$, pawl $j$, shaft $e$, gears $g$ $h$, racks $c$ $d$, and support D, and tail-block C, as specified.

In testimony that I claim the foregoing I have hereunto set my hand this 24th day of March, 1873.

ASA T. WING.

Witnesses:
 WM. FRANKLIN SEAVEY,
 GEO. F. DILLINGHAM.